United States Patent
Zubair et al.

(10) Patent No.: US 7,527,145 B2
(45) Date of Patent: May 5, 2009

(54) LOW-FRICTION CONVEYOR

(75) Inventors: Omair Zubair, Kenner, LA (US);
Gerald O'Connor, Mandeville, LA (US);
Kyle Sedlacek, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 98 days.

(21) Appl. No.: 10/515,786

(22) PCT Filed: May 30, 2003

(86) PCT No.: PCT/US03/17133

§ 371 (c)(1),
(2), (4) Date: Nov. 24, 2004

(87) PCT Pub. No.: WO03/101865

PCT Pub. Date: Dec. 11, 2003

(65) Prior Publication Data

US 2005/0150748 A1    Jul. 14, 2005

(51) Int. Cl.
B65G 39/20 (2006.01)
B65G 15/60 (2006.01)
B65G 21/20 (2006.01)
B65G 17/06 (2006.01)
B65G 17/38 (2006.01)

(52) U.S. Cl. .............. 198/845; 198/850; 198/853; 198/851; 198/837

(58) Field of Classification Search .......... 198/845, 198/842, 835, 837, 779, 850, 851, 853
See application file for complete search history.

(56) References Cited

U.S. PATENT DOCUMENTS

| | | | |
|---|---|---|---|
| 3,674,130 A | 7/1972 | Carmichael | |
| 3,865,229 A | 2/1975 | Velander | 198/193 |
| 3,877,567 A | 4/1975 | Sommerfield | 198/189 |
| 4,418,817 A | 12/1983 | Martin et al. | 198/845 |
| 4,558,779 A * | 12/1985 | Schmitt et al. | 198/626.3 |
| 4,718,543 A | 1/1988 | Leisner et al. | 198/779 |
| 4,880,107 A | 11/1989 | Deal | 198/779 |
| 5,303,817 A * | 4/1994 | Kissee | 198/833 |
| 5,316,131 A * | 5/1994 | Bonnet | 198/842 |
| 5,377,819 A * | 1/1995 | Horton et al. | 198/853 |
| 5,404,997 A | 4/1995 | Schrier et al. | 198/779 |
| 5,489,020 A | 2/1996 | Clopton | 198/851 |
| 6,073,747 A * | 6/2000 | Takino et al. | 198/370.09 |
| 6,129,202 A * | 10/2000 | Layne et al. | 198/831 |
| 6,148,990 A | 11/2000 | Lapeyre et al. | 198/779 |
| 6,209,714 B1 * | 4/2001 | Lapeyre et al. | 198/779 |
| 6,318,544 B1 * | 11/2001 | O'Connor et al. | 198/853 |

(Continued)

Primary Examiner—Gene Crawford
Assistant Examiner—Ramya G Prakasam
(74) Attorney, Agent, or Firm—James T. Cronvich

(57) ABSTRACT

A low-friction conveyor (10) including a conveyor belt (12) supported on self-contained rollers (32) riding along a carryway (22). The conveyor includes a modular conveyor belt constructed of a series of rows of belt modules (24, 25) connected into a loop by hinge joints between adjacent rows (26). The belt is supported on a carryway. Drive surfaces are accessible from the interior side (28) of the belt loop. Drive elements, such as sprockets (16), drive on the drive surfaces to move the belt along the carryway. The belt rollers are recessed inward of the outer side (29) of the belt loop and extend past the interior side of the belt loop. In this way, the rollers engage the carryway in low-friction, rolling contact.

3 Claims, 5 Drawing Sheets

U.S. PATENT DOCUMENTS

| | | | |
|---|---|---|---|
| 6,364,095 B1 | 4/2002 | Layne et al. | 198/852 |
| 6,494,312 B2 | 12/2002 | Costanzo | 198/852 |
| 6,523,672 B2 | 2/2003 | Greve | 198/459.8 |

* cited by examiner

LOW-FRICTION CONVEYOR

BACKGROUND

This invention relates to power-driven conveyors and, more particularly, to low-friction conveyors using modular conveyor belts. The invention also relates to methods for making such conveyor belts.

When articles being conveyed on a moving conveyor start to back up, trailing articles push against leading articles. The result is a buildup of backline pressure, which is greatest on the lead articles. Too much backline pressure can crush or otherwise damage the articles and load the conveyor because of the dynamic friction between the moving conveyor and the stalled or slowly moving articles.

In the corrugated industry, stacks of corrugated sheets are conveyed along a processing line. A common way to convey these stacks is with powered roller conveyors. In these conveyors, parallel cylindrical rollers with axes of rotation transverse to the conveying direction are arranged to form a rolling conveyor bed. Drive belts are often used to contact the rollers to rotate them and propel the stacks along the roller bed. To eliminate backline pressure by preventing consecutive stacks from bumping into each other, the roller conveyor is divided into successive accumulation zones of fixed length The rollers in one zone are powered independently of those in another zone. In this way, when a downstream stack is stopped in one zone of the conveyor, the trailing upstream stack can be moved from zone to zone and stopped in the zone just upstream of the stopped downstream stack without contact. Various drive arrangements are used to achieve individual zonal control by selectively engaging the rollers in each zone with the drive belt.

In another version, a conveyor belt is flanked on each side by a roller conveyor bed. The stack of corrugated sheets rests atop both roller conveyor belts. Portions of the conveyor belt are raised and lowered into and out of contact with the bottom of the stacks. When raised into contact, the conveyor belt transports the stack along; when the belt is lowered out of contact, the stack rests in place on the two roller conveyor beds. Thus, each portion of the conveyor belt that can be raised and lowered defines an accumulation zone.

But these zero-back-pressure roller conveyors have shortcomings. The rollers have a tendency to freeze up or their mounting holes to wallow out over time, resulting in such performance deficiencies as increased friction against the conveyed stacks, a bumpy conveyor bed, and excessive noise. Roller conveyors also cause a stack of corrugated to form an "elephant foot" as it is conveyed. There are a couple of causes for the "elephant foot." As the stack traverses the spacing between consecutive rollers, the leading edge of the bottommost sheets bumps into the upcoming roller. Each time this occurs, the sheets above tend to creep forward relative to the bottom sheets. Article creep is also caused by a wave effect. The weight of the stack on the bottom-most sheets makes them conform to the rollers. The closer a sheet is to the bottom of the stack, the more it deforms around the rollers into the inter-roller gaps and adopts a wavy shape. As the stack moves over the rollers, the wave dynamically propagates upward into the stack, causing adjacent sheets at the bottom of the stack to creep. On a long conveying path over many rollers, the side profile of the stack resembles an "elephant foot" with the leading edge of the bottom-most sheet lagging the leading edge of the topmost sheets. If the "elephant foot" becomes too exaggerated, the stack becomes unstable, and sheets tip over, requiring manual intervention to rearrange the stack.

One way to achieve zero back pressure and minimize the "elephant foot" problem is to use a series of conveyor belts, or chains, arranged end to end with a small space between consecutive belts. Each belt, which forms an accumulation zone, is individually controlled by its own drive train and sprockets or pulleys. The flat conveying surfaces provided by the belts avoid the bumpiness of a roller conveyor, and the "elephant foot" problem is minimized. But such an arrangement is more complex and costly in that multiple sprockets, shafts, and drive motors are required to handle all of the zones, especially in a long conveyor system. Furthermore, all these fixed-length zone systems cannot efficiently accumulate stacks of different sizes or stacks that take up more conveyor space than the length of a zone or much less space then the length of a zone.

Modular conveyor belts, especially modular plastic conveyor belts, are widely used in the food processing industry to convey food and beverage products. These endless belts are generally looped around sets of drive sprockets or drums at opposite ends of a conveyor section. The products are carried along the carryway portion of the belt's path, and the belt returns below along a returnway. The belt is supported in the carryway, which can be a solid plate or wearstrips. The belt slides along the carryway as it is driven. In most food-handling applications, these belts are relatively lightly loaded, and the friction between the belt and the carryway is not too great a problem But, in transporting heavy loads, such as stacks of corrugated sheets, the friction between a belt and its carryway can be significant, requiring larger drive motors and resulting in accelerated belt wear and jerky belt motion. These are some of the reasons that roller conveyors are usually used in the corrugated industry. And, in some applications, plant space is limited. Larger-diameter drive sprockets may not be possible because of vertical space limitations on the spacing between the belt's carryway and returnway. Big drive motors may also be unable to meet the space requirements. Furthermore, limitations on motor size limit conveyor length.

Thus, there is a need for a low-friction conveyor capable of compactly transporting heavy loads and avoiding the problems caused by roller conveyors.

SUMMARY

These needs and others are satisfied by a low-friction conveyor having features of the invention. The conveyor includes a modular conveyor belt constructed of a series of rows of belt modules connected serially at hinge joints to form an endless belt extending in width between opposite edges. The belt, which is supported in a carryway, has a first side facing the carryway and an opposite second side. Drive surfaces on the belt are accessible from the first side. A drive system includes drive elements that engage the drive surfaces to drive the belt along the carryway in a direction of travel. The belt also includes rollers that rotate about transverse axes parallel to the hinge joints. The rollers are recessed inward of the second side and extend past the first side of the belt to engage the carryway in low-friction rolling contact.

Another version of low-friction conveyor includes a carryway supporting a pair of modular conveyor belt loops in parallel. A drive system drives the pair of modular conveyor belt loops along the carryway in a direction of belt travel. Each of the modular conveyor belt loops includes a plurality of rollers extending from the interior of the modular conveyor belt loops to ride along the carryway in rolling contact.

In a method for constructing a low-friction modular conveyor belt according to another aspect of the invention, a plurality of belt modules, including roller-top belt modules, are interconnected in a series of rows. The series of rows extends from a first row to a last row. An inside-out belt loop is formed with the rollers of the roller top belts facing the interior of the belt loop. The first row is then connected to the last row to close the loop. A belt loop with rollers on the interior of the loop is thereby formed.

DRAWINGS

These and other features and aspects of the invention, as well as its advantages, are described in more detail in the following description, appended claims, and accompanying drawings, in which:

FIG. 1 is an isometric view of a conveyor system embodying features of the invention;

FIGS. 2A, 2B, 2C, and 2D are top, side elevation, front elevation, and perspective views of a conveyor belt module usable in a conveyor system as in FIG. 1;

DETAILED DESCRIPTION

Figure 1:
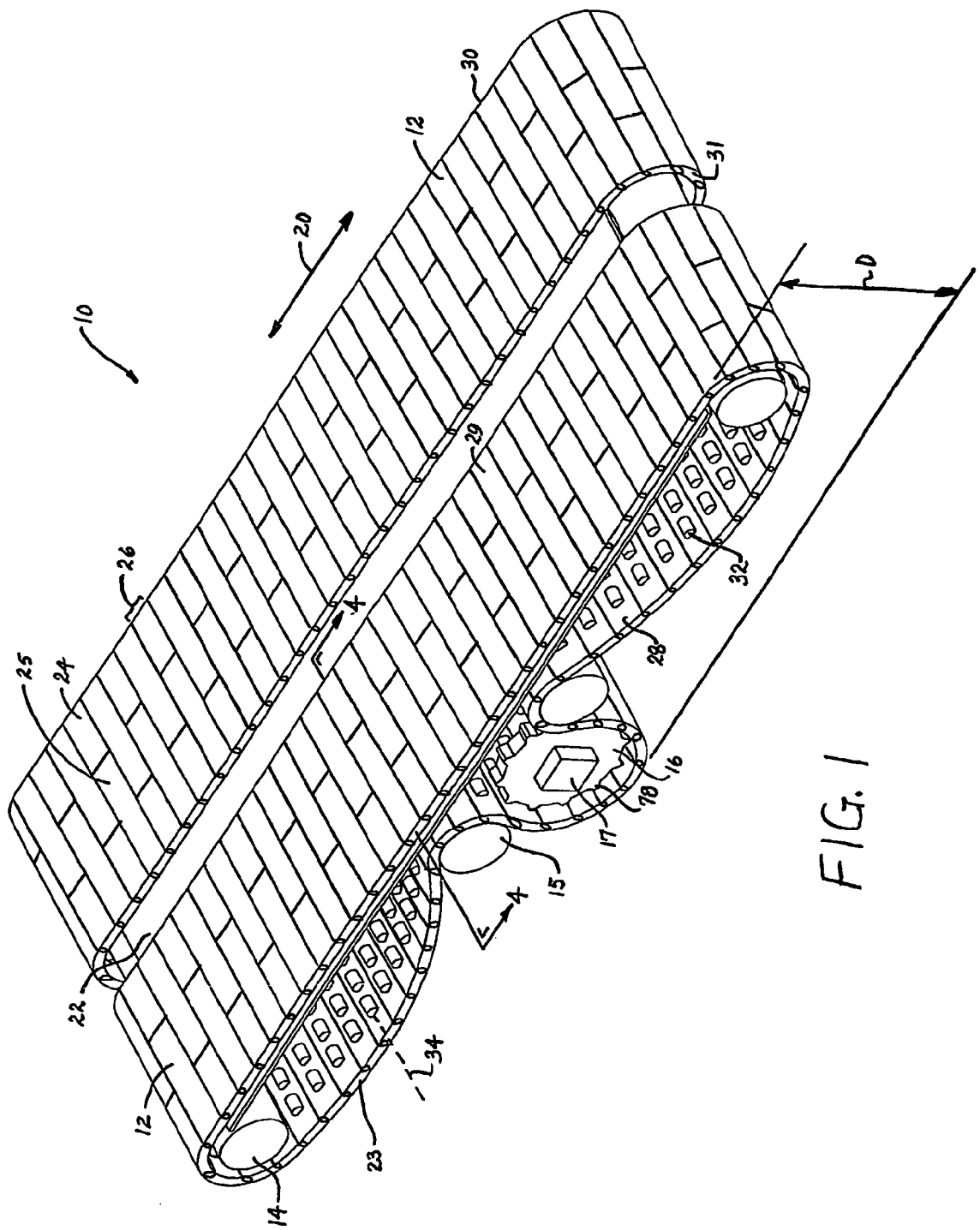
Figure 2A:
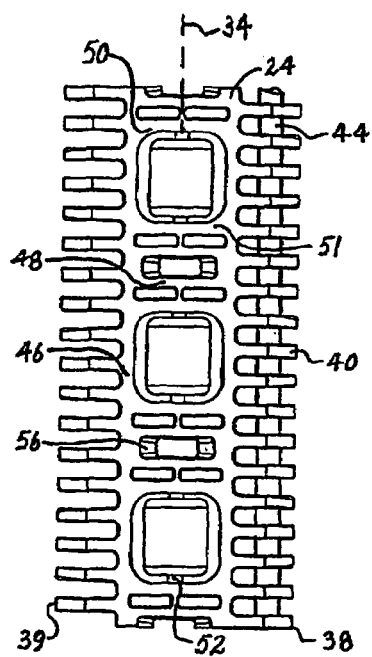
Figure 2D:
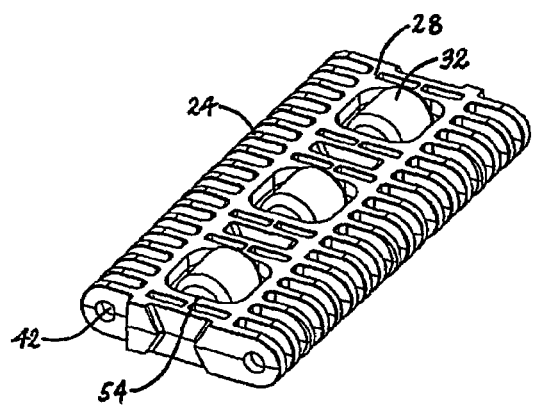
Figure 2B:
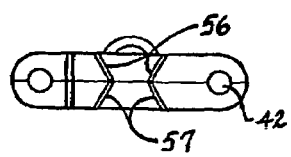
Figure 2C:
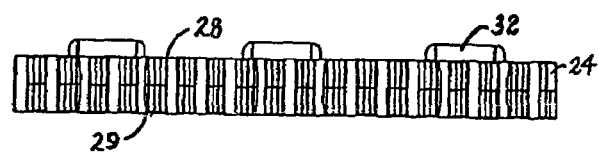

A low-friction conveyor 10 embodying features of the invention is shown in FIG. 1. The conveyor includes a pair of side-by-side conveyor belts, such as modular conveyor belts 12, looped around rollers 14 at each end. The upper plane of the belts is supported on a carryway 22. The carryway shown in this example is a plate carryway, but it could alternatively be formed by laterally spaced wearstrips parallel to the direction of belt travel 20. The carryway and the rollers are supported conventionally by frame structure in a conveyor frame (not shown in FIG. 1). The belts return below the carryway in a returnway 23 supported by returnway rollers 15. The belts are driven in parallel in the direction of belt travel by sprocket sets 16 mounted on drive shafts 17 located centrally along the returnway in the interior of the belt loop.

Each conveyor belt 12 is preferably a modular plastic conveyor belt, such as the Series 400 Roller Top Belt manufactured by Intralox, Inc. of Harahan, La., USA. Each belt is preferably arranged in a bricklay pattern of two or more modules 24, 25 per row 26 to form a belt of any desired width, but could just as well be molded to width with a single module in each row. Each belt extends through its thickness from a first side 28 to an opposite second side 29 and transversely in width between opposite edges 30, 31. Rollers 32 extend past the first side, but are recessed inward of the second side. The rollers are arranged to rotate about axes 34 transverse to the direction of belt travel. This is unlike the regular construction of a roller top belt in which the rollers face away from the carryway to support articles conveyed along a carryway in rolling contact so as to provide low backline pressure to backed-up articles. In this construction, however, each belt is built inside out so that the rollers instead ride along the carryway in low-friction contact. The second side 29 of the belt in this example forms a generally flat conveying surface to support conveyed articles, such as stacks of corrugated sheets.

Further details of a roller-top conveyor belt module usable in the version of FIG. 1 are shown in FIG. 2. The module 24 extends from a first end 38 to a second end 39. Hinge elements 40 are spaced apart along each end. Holes 42 are formed through the hinge elements to receive a hinge pin 44 that connects serially adjacent modules together at a transverse hinge joint formed by the interleaved hinge elements of the interconnected modules. The hinge elements extend from transverse intermediate members 46 and are offset from one end to the other. Longitudinal intermediate members 48 connect between the transverse members. Curved members 50, 51 between the transverse members form supports for rollers 32. Roller axles 52 extend through bores 54 formed in the rollers. The axles are arranged on an axis 34 generally parallel to the hinge joints and the confined hinge pins. Drive surfaces 56, accessible from the first side 28 of the module, receive a driving force from a drive element, such as a sprocket tooth. In this version, drive surfaces 57 are also accessible from the second side 29 of the module. Thus, the module of FIG. 2 can be joined with other such modules, as well as with other rollerless modules of otherwise similar construction to make a conveyor belt 12 as in FIG. 1.

Figure 3:
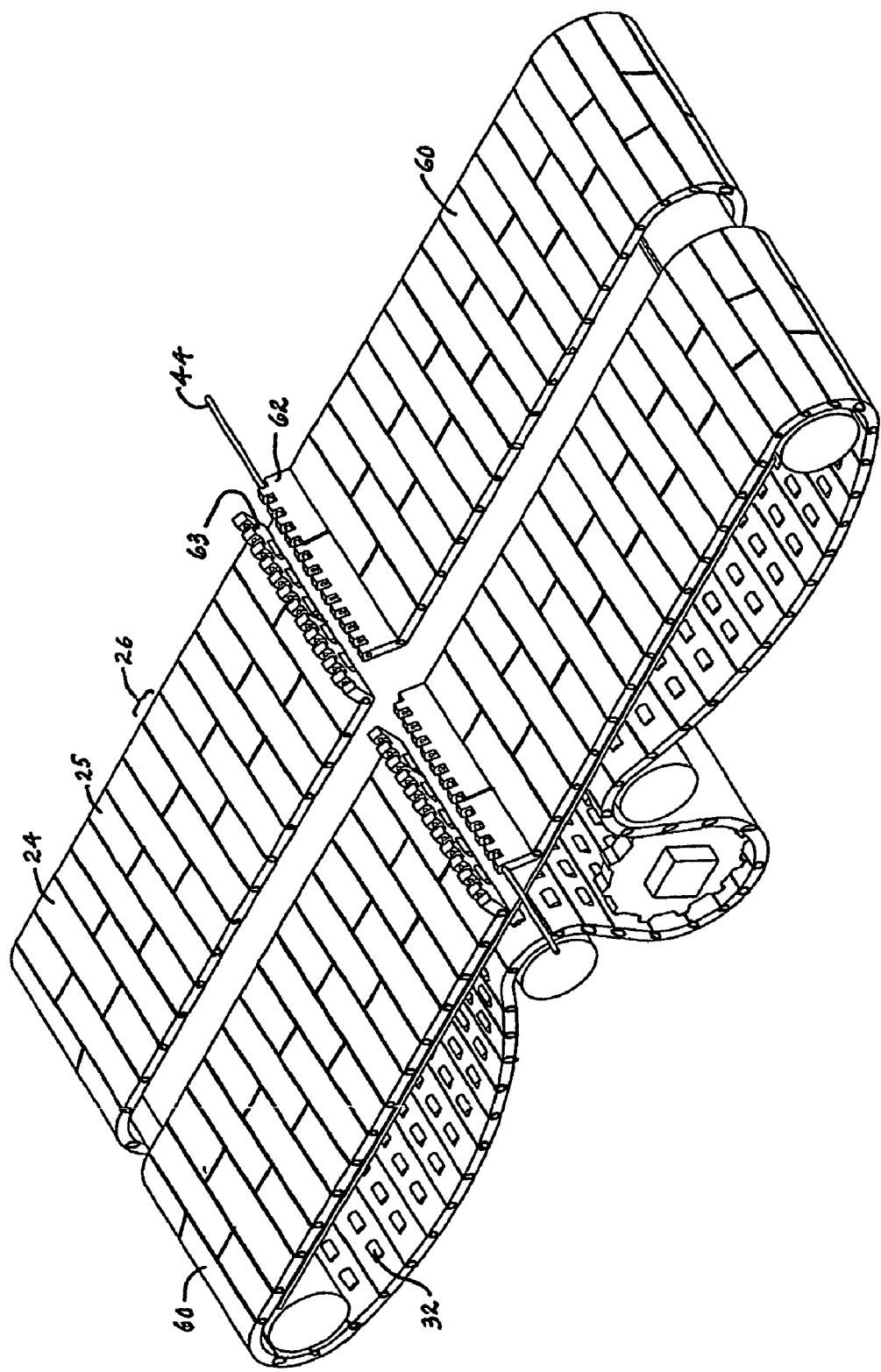
FIG. 3 is an isometric view of a belt loop made of modules such as that in FIG. 2.

Two belt loops 60 made up of modules such as that in FIG. 2 are shown in FIG. 3. Each loop is constructed by first interconnecting series of rows 26 of belt modules 24, 25 with hinge pins connecting adjacent rows together. Once a length of rows is formed, an inside-out loop is formed with the rollers 32 facing the interior of the loop. The first and last belt rows 62, 63 at the ends of the length of belt are then joined by a hinge pin 44 through the interleaved hinge elements of the first and last row. In this way, standard roller-top belt modules can be used to construct a low-friction belt merely by looping it inside out.

Figure 4:
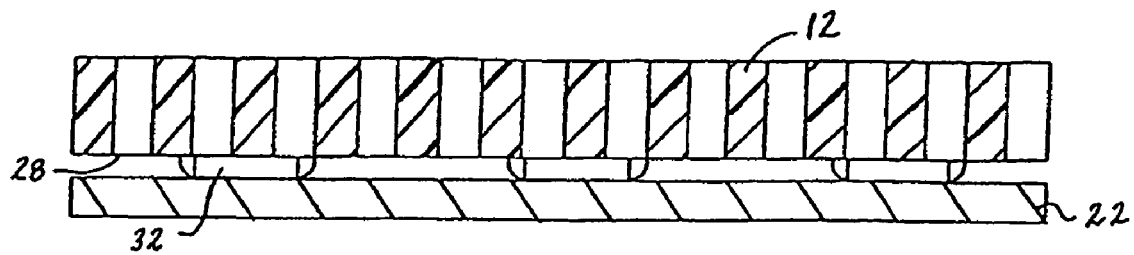
FIG. 4 is a sectional view of the conveyor of FIG. 1 taken along line 4–4 to illustrate the carryway support.

The contact of each belt 12 with the carryway 22 is shown in FIG. 4. As shown, the belt and any conveyed load are supported by the rollers 32. The first surface of the belt 28 is spaced from the plate carryway by the rollers. The plate is typically made of stainless steel and provides a smooth rolling surface for the rollers.

Figure 5:
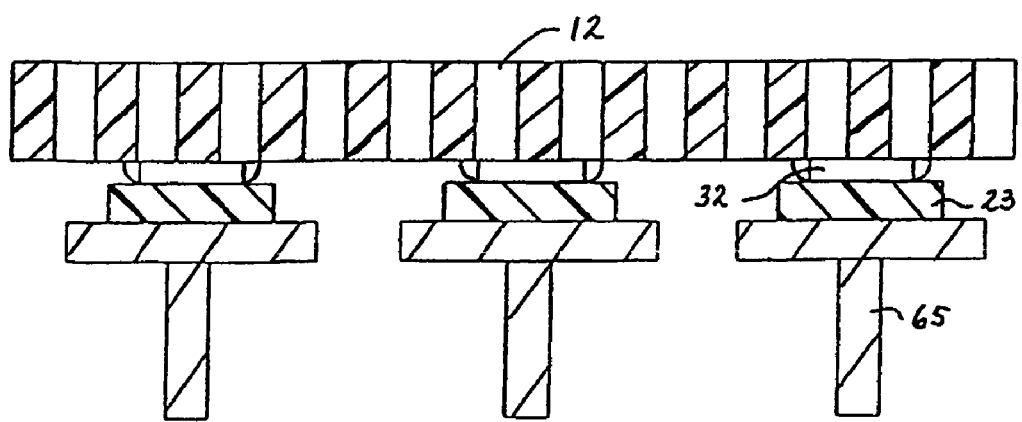
FIG. 5 is a similar view of another version of carryway usable with a conveyor as in FIG. 1.

Another version of carryway is shown in FIG. 5. In this version, the carryway is formed of wearstrips 23 running in the conveying direction and spaced apart across the width of the conveyor. The spacing is selected so that the wearstrips coincide with the positions of the rollers 32 on the belt 12. The wearstrips can be supported on a plate or on individual supports 65, as shown in FIG. 5.

Figure 6:
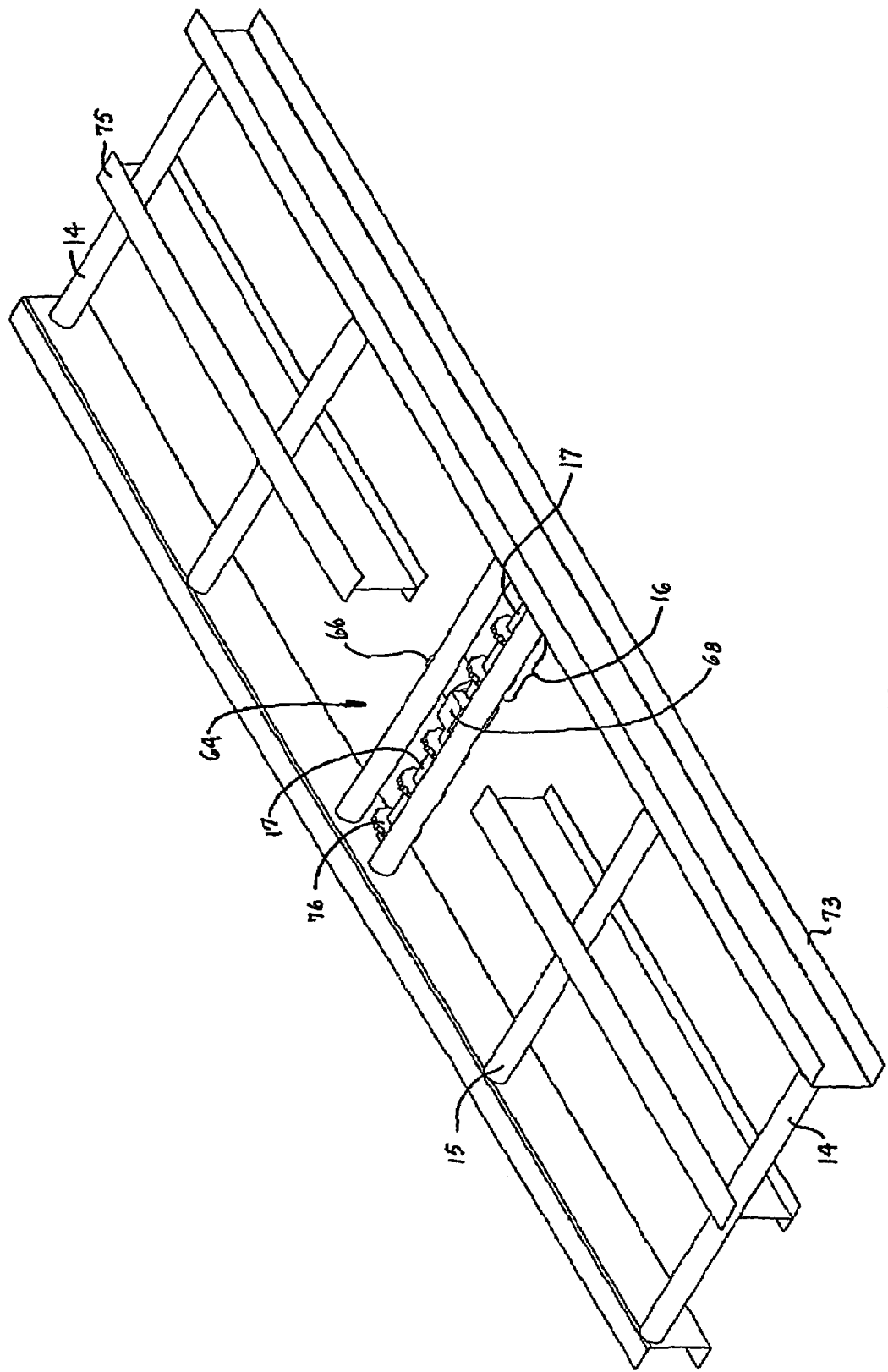
FIG. 6 is an isometric view of the conveyor system of FIG. 1 with the conveyor belts removed to show the drive system

Details of an exemplary drive system 64 for the low-friction conveyor of FIG. 1 are shown in FIG. 6. The drive system shown includes a drive motor 66 whose shaft is coupled to a gear reducer 68. Drive shafts 17 extend laterally from the gear reducer in opposite directions. Sprocket sets 16 are mounted on each drive shaft to drive each belt. The ends of the drive shafts opposite the gear reducer are rotatably supported in bearing blocks (not shown) in side channels 73 of a conveyor frame. A central support beam 75 is interrupted at the position of the drive system to allow the drive system components to fit compactly between the carryway and the returnway. The side channels and the central support beam support the rollers 14, 15 and the carryway (not shown in FIG. 6). The individual sprockets 76, which serve as drive elements, have central bores that admit the drive shaft. Teeth 78 on the periphery of each sprocket engage the drive surfaces 56 of the belt 12 through the first side 28, i.e., the interior side, of the belt loop. As the motor rotates its shaft, the drive shaft, and the sprockets, each belt moves. The rollers on the inside of the belt act as wheels rolling along the carryway and supporting the product load. The rolling friction between this inverted roller-top belt and the carryway is much less than the sliding friction between a conventional belt and the carryway would be for equivalent product loads. Less power is required to drive this low-friction system, which means that smaller drive components and longer belts can be used. Smaller-diameter sprockets permit the carryway and the returnway portions of the belt to be spaced more closely. For example, as shown in FIG. 1, the spacing D between the carryway and the lowest descent of the returnway is preferably no more than about a foot. Furthermore, a smaller motor means lower utility bills. It also means that the motor and the rest of the drive system can even be recessed inward of the opposite belt edges 30, 31 to save even more valuable plant space and avoid interference with processing stations and other plant operations.

Although the invention has been described with respect to a preferred version in compliance with the best mode requirement, other versions are possible. For example, an inside-out roller-top belt with omnidirectional roller balls could alternatively be used to provide low-friction contact with the carryway. As another example, a single inside-out roller-top belt driven conventionally by a sprocket drive system along the carryway would achieve the low-friction benefits of the invention. Thus, the scope of the claims is not meant to be, and should not be, limited to the description of the preferred version.

What is claimed is:

1. A low-friction conveyor comprising:
    a modular conveyor belt including a series of rows of belt modules connected end to end at hinge joints into an endless belt having a width defined by opposite edges;
    a carryway supporting the modular conveyor belt;
    the modular conveyor belt further including:
        a first side facing the carryway and an opposite second side; and
        non-rotatable drive surfaces accessible from the first side of the modular conveyor belt;
    a drive system including rotating drive elements drivingly engaging the drive surfaces from the first side of the modular conveyor belt to drive the modular conveyor belt in a direction of travel along the carryway;
    the modular conveyor belt further including:
        a plurality of rollers mounted to the modular conveyor belt and rotatable about transverse axes offset from and parallel to the hinge joints to ride along the carryway in the direction of travel along with the modular conveyor belt,
        the rollers recessed inward of the second side and extending past the first side of the modular conveyor belt to engage the carryway in rolling contact.

2. A low-friction conveyor as in claim 1 comprising a pair of the modular conveyor belts arranged parallel to each other.

3. A low-friction conveyor as in claim 1 comprising a returnway for the modular conveyor belt spaced along its entirety within about one foot of the carryway.

* * * * *